March 8, 1966 S. POLESCHUK 3,239,081

TRAILER INCLUDING INTERLOCKED EXTRUSIONS IN FRAME

Filed Nov. 6, 1963 5 Sheets-Sheet 1

INVENTOR.

STEPHEN POLESCHUK

BY Oldham & Oldham

ATTYS.

TRAILER INCLUDING INTERLOCKED EXTRUSIONS IN FRAME

Filed Nov. 6, 1963 5 Sheets-Sheet 2

INVENTOR.
STEPHEN POLESCHUK

BY William & William

ATTYS.

March 8, 1966 S. POLESCHUK 3,239,081

TRAILER INCLUDING INTERLOCKED EXTRUSIONS IN FRAME

Filed Nov. 6, 1963 5 Sheets-Sheet 3

INVENTOR.
STEPHEN POLESCHUK
BY O'Callaghan & O'Callaghan

ATTYS.

March 8, 1966 S. POLESCHUK 3,239,081

TRAILER INCLUDING INTERLOCKED EXTRUSIONS IN FRAME

Filed Nov. 6, 1963 5 Sheets-Sheet 4

INVENTOR.
STEPHEN POLESCHUK
BY McCallam & McCallam

ATTYS.

INVENTOR.
STEPHEN POLESCHUK

BY [signature]

ATTYS.

3,239,081

TRAILER INCLUDING INTERLOCKED EXTRUSIONS IN FRAME

Stephen Poleschuk, 355 Deer Trail, Canfield, Ohio
Filed Nov. 6, 1963, Ser. No. 321,846
18 Claims. (Cl. 214—84)

This invention relates to trailers for boats and the like, and more particularly to a trailer frame formed from extruded metal frame members and having all major joints connected by tongue and groove interlocks.

It is known that there are many types of boat trailers utilizing various constructions. However, almost all boat trailers today are made from steel framework and are connected together by welding, rivets, or bolts which require that the trailer assembly be at least substantially completed in the factory and that the trailers be shipped in an assembled condition. This means an inefficient use of shipping space, and high overhead construction costs may be incurred at the factory. Further, steel trailers must be painted, and are subject to rusting problems.

It is the general object of the present invention to avoid and overcome the foregoing and other difficulties of prior art practices by the provisions of a trailer formed from extruded aluminum frame members which utilizes tongue and groove interlocking joint means between the frame members, so that the trailer can be packaged and shipped in a disassembled condition, and which trailer is easily assembled by the purchaser because of the simple, yet highly effective, interlocking joint means provided for connecting the extruded frame means together.

Another object of the invention is to provide a boat trailer which can be packaged and shipped disassembled in a small compact package to greatly reduce shipping costs, and which trailer can be assembled easily by a purchaser in a short time by following simple assembly directions.

Another object of the invention is to provide a boat trailer made from extruded metal sections so that the trailer is light, durable, and sturdy, which trailer has novel and adjustable bolt positoning and connecting means provided therein.

A further object of the invention is to provide a boat trailer or the like which utilizes extruded metal frames and novel tongue and groove or slotted interlocking means formed at a plurality of locations on the trailer to form a trailer which can be sold disassembled, and which trailer when assembled is attractive, and requires no painting.

The aforesaid objects of the invention, and other objects which will become apparent as the description proceeds, are achieved by providing in a trailer for boats and the like, as one embodiment of the invention, the combination of a plurality of extruded hollow metal members, some members being formed with female contoured locking slots and some members being formed with locking keys thereon complementary in shape to said slots, said members being operatively connected to form the trailer frame in which said keys slidably engage said slots to form positive interlocks between said members, means to secure said interlocked members in positon and prevent sliding movement thereof, and metal interlocking means connected between any of said members which meet at the ends thereof at substantially 90° angles. Other substantially conventional members may be used to complete the trailer.

For a better understanding of the invention, reference should be had to the accompanying drawings wherein.

When referring to corresponding members shown in the drawings and referred to in the specification, corresponding numerals are used to facilitate comparison therebetween.

Figures 1, 21:
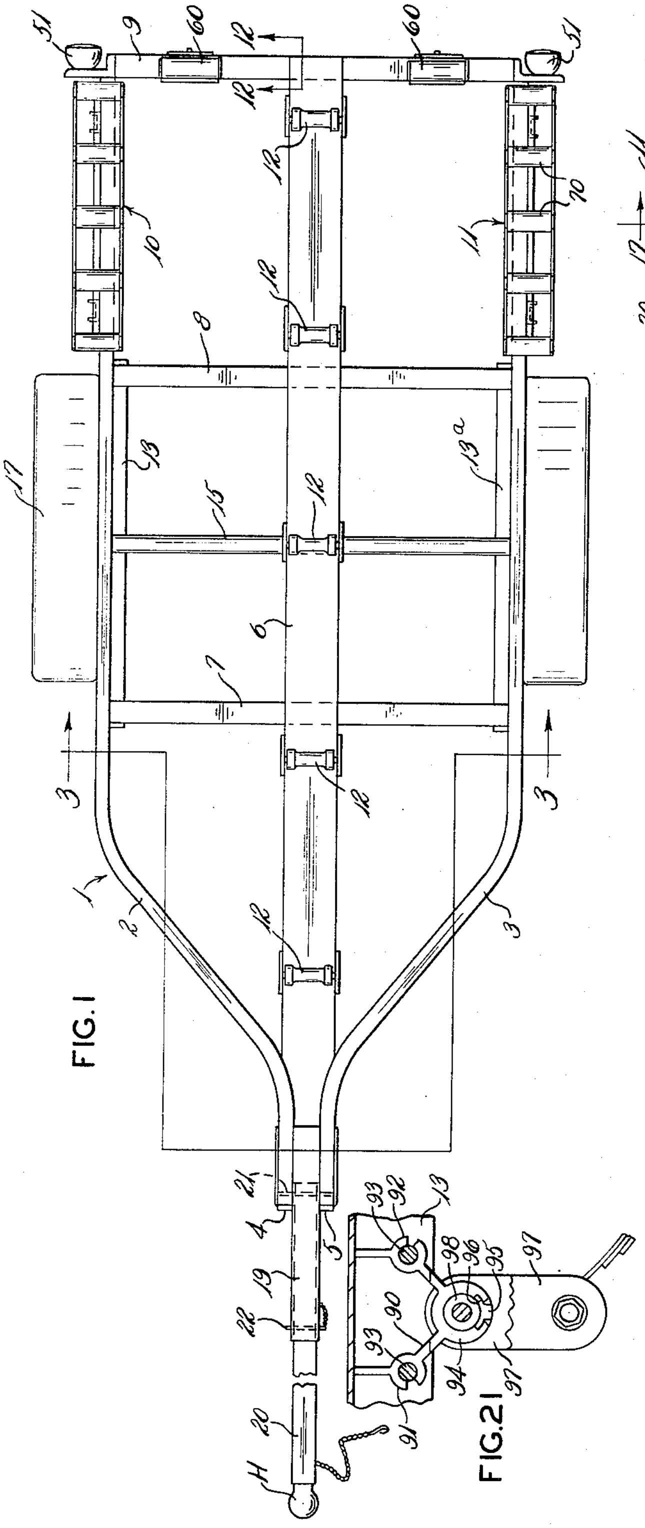
FIG. 1 is a plan view of the trailer frame assembly comprising one embodiment of the invention.
FIG. 21 is a fragmentary, enlarged vertical section of the spring shackle support for the new trailer.
Figure 8:
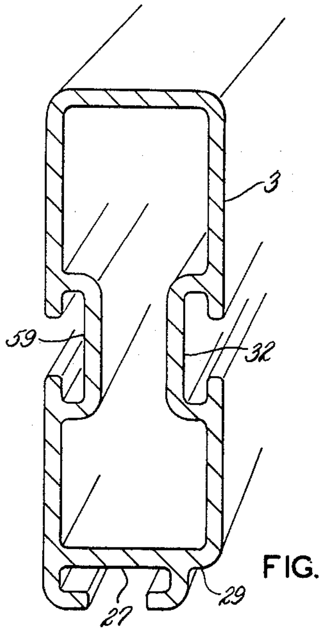
FIG. 8 is an enlarged perspective view, partially shown in vertical cross section, of a side rail shown in FIG. 3.
Figure 9:
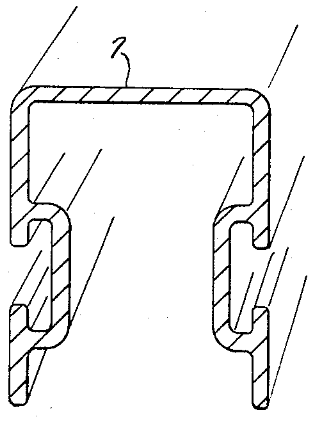
FIG. 9 is an enlarged perspective view, partially shown in vertical cross section, of a cross channel taken on the line 9—9 of FIG. 3.
Figure 10:
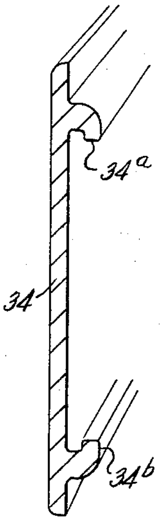
FIG. 10 is an enlarged prespective view, partially shown in vertical section, of a joiner plate shown in FIG. 3.

Attention is now particularly directed to the details of the structure shown in FIG. 1 of the drawings, wherein the numeral 1 represents generally a boat trailer. The trailer 1 comprises a pair of hollow extruded box-shaped aluminum side rails 2 and 3, respectively, which extend from closely spaced relation at the forward end of the trailer assembly to a wide parallel relation at the rear. Suitable end caps or covers 4 and 5, respectively, may be provided to cover the open front ends of the side rails 2 and 3. The cross sectional configuration of the side rails is indicated in FIG. 8, and will be described more extensively with respect to the interlocking assembly hereinafter.

Figure 2:
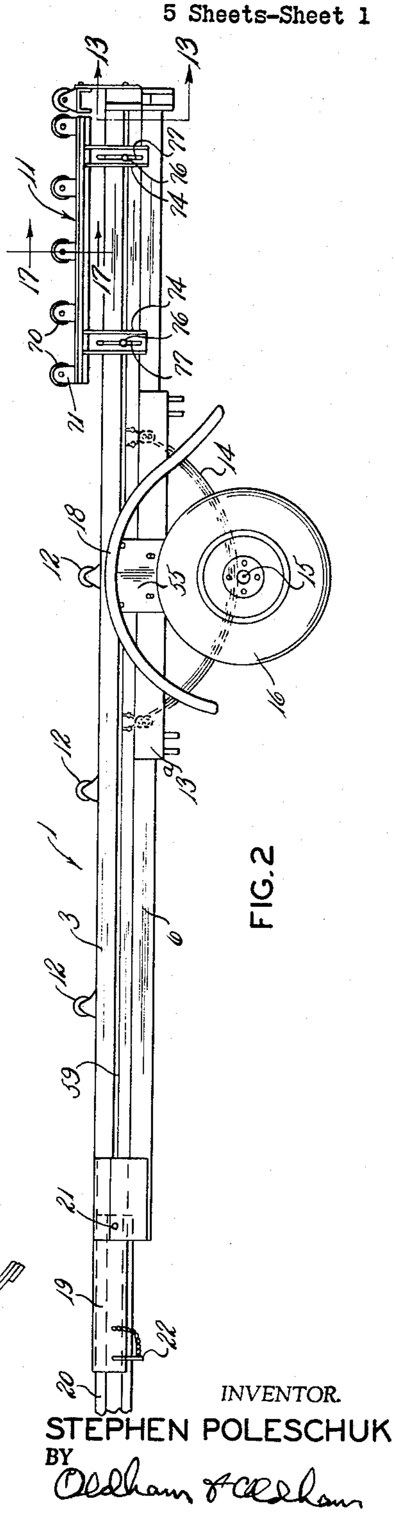
FIG. 2 is a side elevation of the embodiment of the invention shown in FIG. 1.
Figure 3:
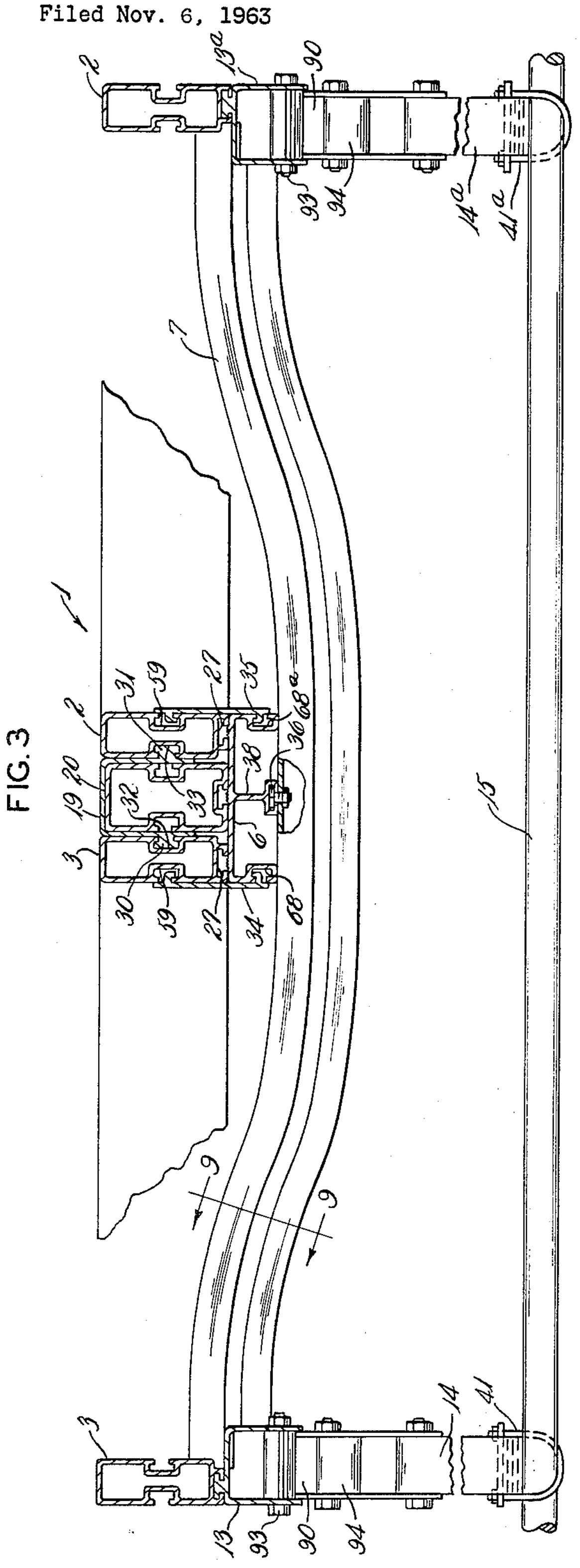
FIG. 3 is a vertical cross sectional view of the frame assembly taken substantially on the line 3—3 of FIG. 1, but also showing the bolt means connecting the catwalk to a cross channel.

A relatively wide, vertically short catwalk 6 is operatively secured to the bifurcated front portions of the side rails 2 and 3 and extends to the rear of the trailer bisecting the spaced portion of the rearwardly extending side rails. A plurality of generally inverted U-shaped cross channels 7, 8 and 9, respectively, are provided to support the catwalk 6 and rigidly brace and extend between the side rails 2 and 3. Cradle assemblies 10 and 11 are mounted to the side rails 2 and 3, respectively, to provide support for a boat, as will be more fully described hereinafter. A plurality of rollers 12 are provided on the catwalk 6 to assist in moving a boat on and off the trailer. Spring frames 13 and **13*a*, as best shown in FIGS. 2 and 3, are mounted to the side rails 2 and 3 and carry leaf springs 14 and 14*a* which are mounted in the manner shown in FIG. 21. An axle 15 is mounted by the springs 14 and 14*a* and carry wheels 16 rotatably mounted thereto. Fenders 17 and 18, respectively, cover the wheels 16**.

Figures 6, 7:
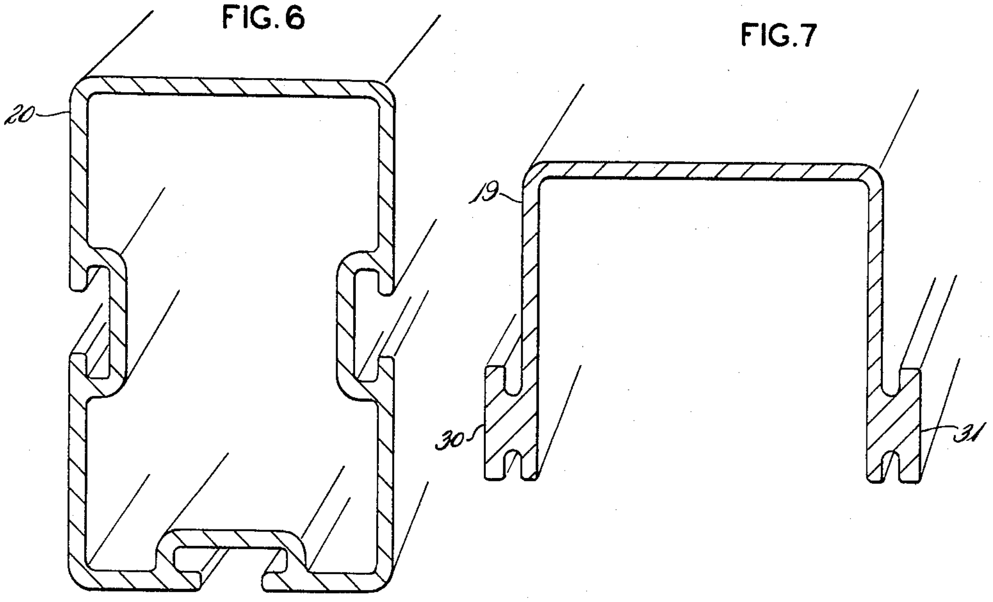
FIG. 6 is an enlarged perspective view, partially shown in vertical cross section, of the tongue member of FIG. 3.
FIG. 7 is an enlarged perspective view, partially shown in vertical cross section, of the key and tongue cover shown in FIG. 1.

A key and tongue cover 19 is positioned between and extends forwardly from the slot formed by the front ends of the side rails 4 and 5. The cover 19 has a cross sectional shape as seen in FIG. 7 and is interlocked with the side rails 2 and 3, as particularly seen in FIG. 3. This interlocking construction will be more fully described hereinafter. A tongue 20 is slidably positioned inside the key and tongue cover 19 and is mounted for pivotal movement therewith, as by a bolt, or pin 21. In order to maintain a rigid connection between the tongue 20 and the key and tongue cover 19, a removable pin 22 is provided to extend therethrough. It should be noted that removal of the pin 22 will allow the trailer 1 to tilt upwardy at the front and downwardly at the rear to facilitate launching of the boat. A conventional vehicle hitch H is secured to the front end of the tongue 20.

The utility of the invention disclosed herein resides in the fact that all the main strength carrying members are made from suitable extruded metal such as aluminum which greatly reduces fabricating costs and substantially reduces the weight of the finished trailer. Only a relatively few different extruded shapes are required in the novel trailer of the invention. Each main load carrying member is made with, for example, either male T-shaped interlocking keys or female T-shaped receiving slots so that the members forming the trailer may be ingeniously interlocked together by engagement of the keys and slots thereby greatly reducing the number of bolts or rivets required to effect assembly, and eliminating welded joints completely, which thereby allows the trailer to be shipped disassembled and be assembled quickly and easily by the purchaser, or retailer.

With specific reference to FIGS. 4 through 10, the various configurations of the extruded load carrying members are seen. These configurations are easily extrudable shapes, and provide excellent assembly interlocking features, as more particularly described hereinafter.

Figures 11, 12, 13, 14, 15:
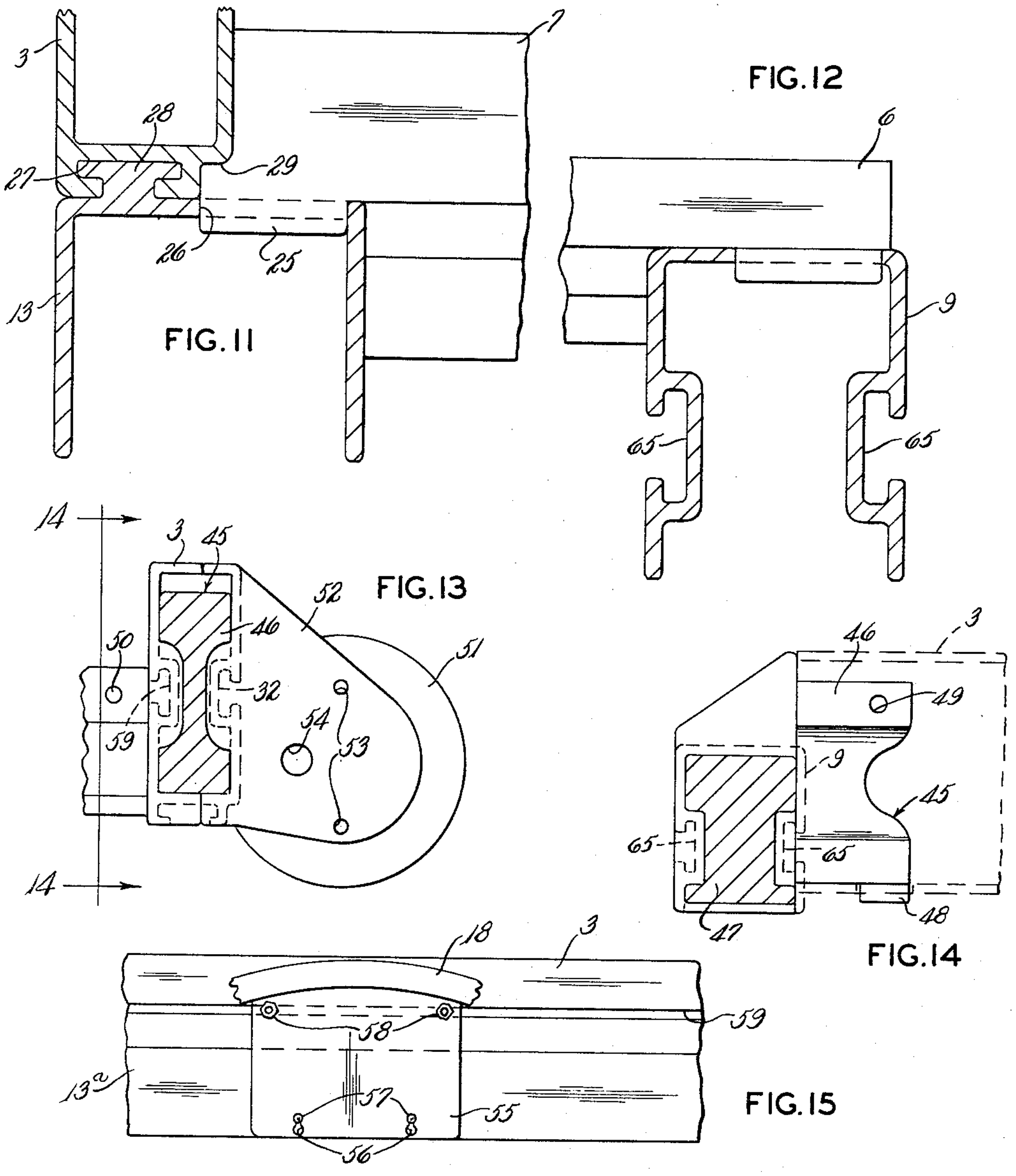
FIG. 11 is an enlarged fragmentary vertical cross sectional view of the spring frame, side rail, and cross channel interlocked together to show the connection therebetween.
FIG. 12 is an enlarged fragmentary vertical cross sectional view of the end cross channel and the end of the catwalk showing the slotted fit between the catwalk and the cross channel, as taken on line 12—12 of FIG. 1.
FIG. 13 is an enlarged fragmentary vertical cross sectional view of the interlocked end connection between the end cross channel and a side rail, as taken on line 13—13 of FIG. 2.
FIG. 14 is an enlarged fragmnetary vertical cross sectional view of the connection between the end cross channel and the end of a side rail, as taken on line 14—14 of FIG. 13.
FIG. 15 is an enlarged fragmentary side elevation of an interlocked side rail and spring frame showing the mounting for the fenders.

With reference to FIG. 11, the interlocking features between the side rail 3, the spring frame 13, and the cross channel 7, is shown. In this assembly, the lower portions of the legs of the U-shaped cross channel 7 are partially cut off at the end to provide a pair of downwardly extending ears 25. The ears 25 drop down into parallel slots 26 in the spring frame 13. One of the slots 26 is clearly seen in FIG. 4. A female T-shaped receiving slot 27 in the lower end of the side rail, as more particularly seen in FIG. 8, is then slidably engaged with the male T-shaped key 28 of the spring frame 13. The key 28 is clearly seen with reference to FIG. 4. A bottom shoulder 29 of the side rail 3 then engages and securely positions the ears 25 of the cross channel 7 in the slots 26 in the spring frame 13. Thus, it is seen that a unique, highly effective, yet extremely simple interlock is achieved between the side rail 3, the spring frame 13, and the cross channel 7.

With reference to FIG. 3, a clear and detailed illustration is shown of the interlocking relation, or connections between the side rails 2 and 3, the catwalk 6, the cross channel 9, the tongue 20, and the key and tongue cover 19. As particularly seen in FIG. 7 of the drawings, the key and tongue cover 20 is provided with a pair of male T-shaped interlocks 30 and 31, respectively. The male interlocks 30 and 31 of the cover 20 engage in female slots 32 and 33, integrally formed, respectively, in the inner legs of the side rails 2 and 3. A pair of locking plates 34 and 35 interlock the side rails 2 and 3 to the catwalk 6, as particularly shown in the drawings, for example, by overhanging opposed lugs **34*a* and 34*b* engaging the slots 59 of the side rail and one of the slots 68 or 68*a* formed in the outer legs of the catwalk 6. As illustrated, the tongue 20 is slidably received in the key and tongue cover 19**, and, as described previously, is mounted for pivotal relation therewith to facilitate boat launching.

Further, with reference to FIG. 3, note that the catwalk 6 is mounted to the cross channel 7 by means of a square headed bolt 36 to aid in retaining the cross channel against longitudinal movement. The head of the bolt 36 is slidably received in a female slot 37 in the bottom center support flange 38 of the catwalk 6. Slot 37 is more clearly seen in FIG. 5. Since the head of the bolt 36 snugly engages the slot 37, there can be no rotational movement thereof, so that it is a simple matter to tighten the nut to secure the cross channel 7 and the catwalk 6 together. Similar means secure the cross channel 8 to the catwalk.

The axle 15 is secured to the springs 14 and **14*a* by means of U-shaped connecting bolts 41 and 41*a* that can be loosened to allow the springs to be turned into alignment with the axle 15** for compact storage and shipping action.

With reference to FIGS. 13 and 14, the interlocking connection between the rear end of the side rail 3, and the rear end channel 9 will hereinafter be explained. In order to properly interlock these members, a separate metal forging, or casting, indicated generally by the numeral 45, is provided. The forging 45 has a suitable I-shaped extension 46, which is slidably received in and shaped complementary to the hollow inner portion of the side rail 3, all as clearly shown in FIG. 13. Further, the forging 45 contains a shorter, squatter I-shaped extension 47, which is normal to the extension 46, and which extends into and is shaped complementary to the hollow inner portion of the cross channel 9, all as clearly seen in FIG. 14. Note, with reference to FIG. 14, that the extension, or leg 46 has a downwardly extending, axially short lip 48 thereon to drop into a slot cut in the bottom of the side rail 3. In order to insure locking engagement of the member 45 to the cross channel 9 and the side rails, aligned holes 49 are provided in the extension 46 and the side rails so that a bolt 50 may be positioned therethrough to secure the members 45 in position. The extensions 46 will engage the cross channel 9 to secure it in position. In order to mount a tail light 51, a flange 52 extends from the member 45, and contains bolt holes 53 by which the stop light 51 may be mounted. A hole 54 may be formed in the flange 52 by which an electrical connection can be made to the stop light 51. Thus, it is seen that a unique and highly effective, easily assembled locking means is provided between the cross channel 9 and the end of the side rails by means of the cast or forged metal member 45.

FIG. 15 illustrates one method of attaching the fender 18 to the side rail 3 and the spring frame 13. Affixed to the fender 18 is a mounting plate 55 which has a pair of mushroom shaped holes 56 therein, which fit over extending rivets, or bolts 57 mounted on and extending from the spring frame 13. Bolts 58 positively secure the fender 18 to the side rail 3. The heads of the bolts 58 are slidably received in the T-shaped slot 59 in the side rail 3 and are secured from rotational movement therein. Slot 59 is seen in FIG. 8.

Figure 16:
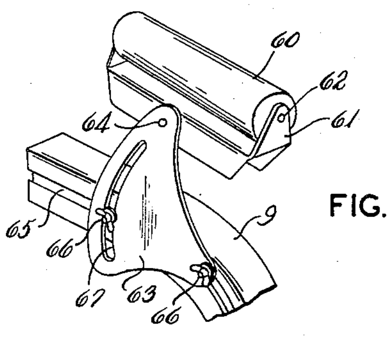
FIG. 16 is an enlarged fragmentary perspective view showing the mounting of one roller on the rear cross channel.

FIG. 16 illustrates the adjustable mounting of a support, and loading or unloading roller 60. The roller 60 is carried by a frame 61 and is mounted for rotational movement, as by a pin 62. The frame 61 is mounted for pivotal movement on a support plate or flange 63, as by a pin 64. The support flange 63 is mounted on the rearward cross channel 9 by a pair of bolts 66 carried in a T-shaped slot 65 in the cross channel. Note that the flange 63 contains an arcuately shaped slot 67 which permits variation in the vertical position of the roller 60. Also, since the bolts 66 are slidably positioned in the slot 65 of the cross channel 9, the roller 60 may be laterally positioned to insure proper support and contact with a boat (not shown).

Figures 4, 5:
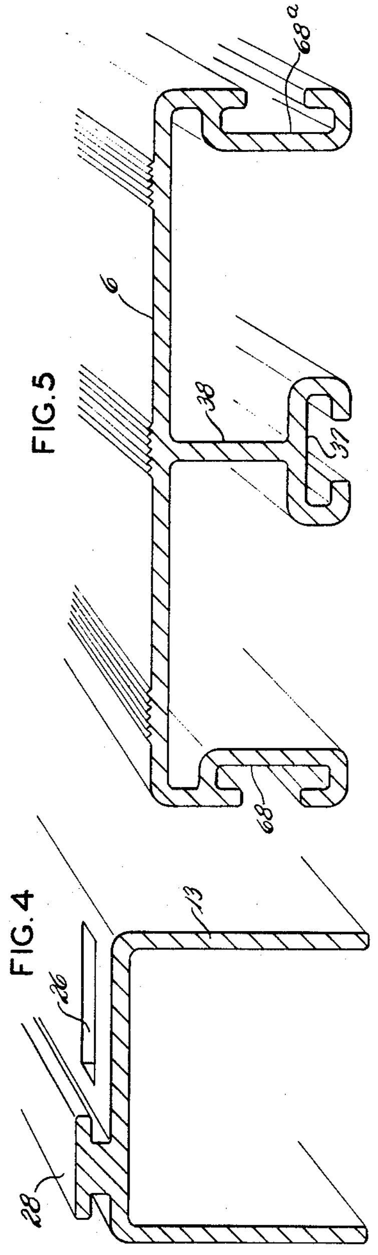
FIG. 4 is an enlarged perspective view, partially shown in vertical cross section, of the spring frame of FIG. 3.
FIG. 5 is an enlarged perspective view, partially shown in vertical cross section, of the catwalk of FIG. 3.

The invention contemplates that the rollers 12, shown in FIG. 1, are also mounted by sliding bolts into the T-shaped side slots 68 and 68*a* in the catwalk 6, in the same manner as the mounting of the plate or flange 63, described above. Slots 68 and 68*a* of the catwalk 6 are shown in FIG. 5.

Figures 17, 20:
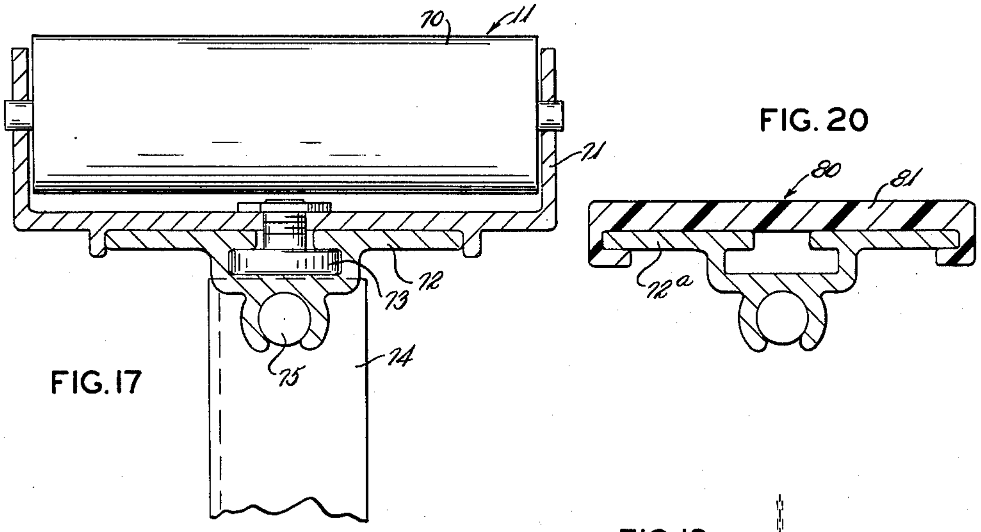
FIG. 17 is an enlarged fragmentary vertical cross sectional view of one roller of the cradle assembly taken substantially on line 17—17 of FIG. 2.
FIG. 20 is a fragmentary vertical section taken on line 20—20 of FIG. 18 to show the contour of the cradle support.
Figure 18:
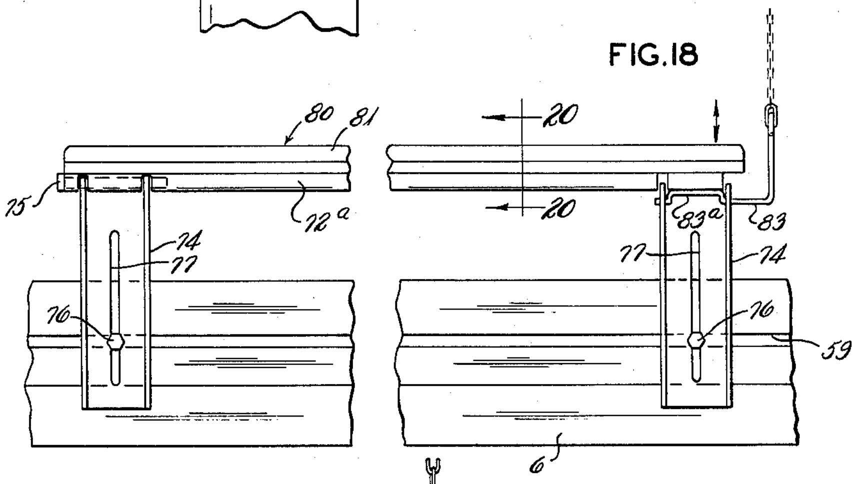
FIG. 18 is an enlarged fragmentary side elevation of a modified cradle assembly having adjustable vertical and longitudinal movement as well as vertical adjustment of one end thereof.

FIG. 17 illustrates the mounting of a roller 70 comprising a part of the cradle assembly 11. The roller 70 is rotatably mounted in a frame 71. The frame 71 is mounted to a carrier bar, or subframe assembly 72 by bolt means 73 as illustrated. The invention contemplates that the frame 71 and assembly 72 both be made from extruded aluminum. A pair of base frames, or channels 74 operatively support a pin 75, which provides a pivotal mounting on one end for the subframe assembly 72. The relation of the pin 75 to the subframe assembly 72 is more clearly seen with reference to FIG. 18, as such parts are the same in both FIGS. 17 and 18. The invention contemplates that the subframe assembly 72 may be snapped or forced onto the pin 75, or the pin 75 may be threaded through a horseshoe shaped opening 76 in the subframe assembly 72. The other end of the subframe assembly 72 is pivotally mounted by an eccentric pivot pin 83 engaging the other base frame 74, as shown in FIG. 18. The eccentric pivot pin 83 provides a slight vertical adjustment to one end of the cradle 11, after it has been properly positioned to insure a proper supporting action by the cradle 11. An eccentric portion 83*a* of the pivot pin or member 83 is raised when the member is moved up vertically to lift the subframe assembly 72 slightly. Since the roller 70 of the cradle assembly 11 is journalled on the frame 71, it can be positioned for rolling and supporting action on the bottom surface of a boat carried by the trailer. In order to adjust the cradle assembly 11 in the vertical direction, the base frame 74 is provided with elongated slots 77 and is mounted on the side rail 3 by bolts 76. Further, since the heads of the bolts 76 are slidably positioned in the slot 59 of the side rail 3, the cradle assembly 11 is adjustable in the longitudinal direction. The member 83 can be suitably secured to a boat carried on the trailer to retain the portion 83*a* in elevated position.

Figure 19:
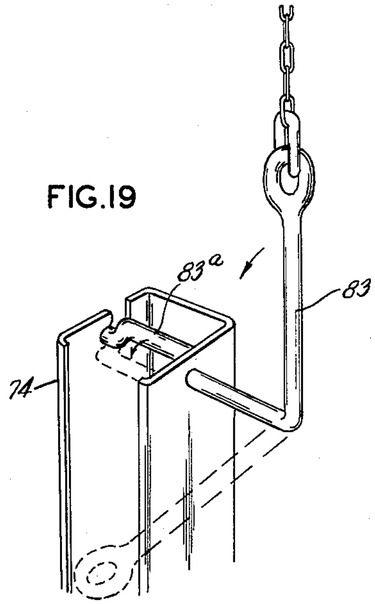
FIG. 19 is a perspective view, partially shown in horizontal cross section, of the eccentric pin and cradle mounting taken on line 19—19 of FIG. 18.

As a variation to the roller cradles 10 and 11, the invention contemplates that a flat padded cradle, indicated by the numeral 80, in FIG. 18, instead of the roller 70, may be provided. This revision may use an extruded plastic cover 81 engaging the subframe assembly or carrier bar 72*a*, as shown in FIG. 19. Further, FIG. 19 illustrates the relation of the eccentric pivot pin or member 83 to the subframe assembly 72*a* and FIG. 20 shows how the cover 81 is slidably positioned over the subframe assembly 72*a* and held in place by a friction fit.

The flat cradle is usually better for storage and riding of a boat, but does not assist very well in the launching or recovering of a boat. The invention anticipates that the flat cradle 80 and the roller 70 may be interchangeable, as desired.

The invention contemplates that the cradle assemblies 10 and 11 should assist in launching and recovering the boat by providing rolling support and further, that they should provide lateral riding support to a boat during transit with the boat secured to the trailer.

FIG. 21 shows that an extruded support 90 preferably is provided in the trailer of the invention for supporting the springs 14 and 14*a*. The support 90 is positioned to extend transversely of the trailer frame and is snugly received between the legs of the U-shaped longitudinally extending spring frame 13 and it includes slotted arcuate sections 91 and 92 to receive bolts 93 secured to the spring frame 13 to attach the supports 90 to the trailer frame. The supports 90 extend below the spring frame 13 and include an arcuate section 94 therein. By forming the sections 91, 92 and 94 as arcs and not complete sleeves, the formation of the supports 90 is completed for good bearing support action by a T-shaped key 95 that can be slid into engagement with the slot in the arcuate section 94 and engage a radially inner shoulder 96 formed on adjacent portions of the inner periphery of the section 94. The key 95 forms a continuous sleeve, or cylinder with the section 94. Support for spring shackles 97 is provided, for example, by one or a pair of resilient sleeves 98 snugly received within the cylinder formed by the section 94 and the key 95. Such resilient sleeves 98 aid in retaining the key 95 in position, and one of the sleeves is engaged with such cylinder from each end thereof.

Even though it is believed that the structure of the boat trailer will be apparent from the foregoing description, a brief review thereof will now be made for purposes of summary and simplification. Particularly, the invention utilizes extruded metal frame strength or load carrying members which are then bent to the proper shape by hydraulic presses, or other similar means. Each strength member extruded is formed with either male locking keys or female receiving slots shaped complementary to the locking keys so that the entire structure can be interlocked together when assembled with no riveting or welding, and with very few bolt means required. Because of the simplicity of the interlocking construction, and the ease of assembly, the trailer may be shipped disassembled in kit form to further reduce production overhead, shipping costs, and final commercial sales prices. A unique interlocking feature is achieved in locking the side rails, catwalk, tongue, and key and tongue cover together utilizing one bolt, or pin which further serves as a pivot point for the tongue. A novel interlocking structure is achieved to connect the cross channels to the side rails which interlock requires no bolt or pin means. A unique interlocking structure is achieved between the rear cross channel and the ends of the side rails by utilizing a cast or preformed member and two bolts. The cradle and roller assemblies are mounted adjustably in the vertical and longitudinal directions. All bolts are received in the female T-shaped slots to permit longitudinal adjustment and prevent bolt rotation.

It will be recognized that the objects of the invention have been achieved by providing a lightweight, high strength, durable and easily assembled boat trailer made from extruded metal strength members which utilizes a unique interlocking structure between the associative members.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a frame for a trailer for boats and the like, the combination of a plurality of extruded hollow metal members, some members being formed with female contoured locking slots extending the length thereof and some members formed with locking keys thereon extending the length thereof and being complementary in shape to said slots, said members being operatively connected to form said frame so that said keys slidably engage said slots to form postiive slidable interlocks between said members, means to secure said interlocked members in position and prevent sliding movement thereof, and metal interlocking means having arms thereon normal to each other for telescoping engagement with end portions of a pair of said members to provide positive interlocking between said members which meet at the ends thereof at substantially 90° angles.

2. In a trailer for boats and the like, the combination of a pair of horizontally positioned extruded metal side frames operatively positioned at one end to form a parallel bifurcated slot, said frames extending rearwardly to parallel spaced relation towards the opposite end, a tongue cover operatively interlocked in said bifurcated slot formed by said side frames and extending forwardly therefrom in parallel relation to said side frames, a tongue adapted to be operatively connected to a trailer hitch slidably received in said tongue cover, extruded metal spring frame means operatively interlocked to said side frames, a plurality of extruded metal cross channels operatively positioned for support between the spaced parallel sides of said side frames, said cross channels engaging and being operatively interlocked to said side frames and said spring frame means, an extruded metal catwalk engaging and being operatively interlocked in said bifurcated slot formed by said side frames, said catwalk extending inwardly parallel to and bisecting the space between said side frames, bolt means extending between and securing said catwalk to said cross channels, a plurality of rollers mounted to said catwalk, said rollers being adjustable in vertical and longitudinal directions with respect to said catwalk, an end cross channel operatively positioned between the ends of said side frames, and metal locking means operatively engaging and extending between the end cross channel to the ends of said side frames.

3. In a trailer for boats and the like, the combination of a hollow extruded aluminum catwalk having female T-shaped slots therein, a pair of hollow extruded aluminum side rails having female T-shaped slots therein, said side rails operatively positioned at one end to form a parallel bifurcated slot engaging one end of said catwalk, and said side rails extending outwardly toward the opposite end of said catwalk, said side rails being in a parallel spaced relation to each other and to the catwalk, a pair of extruded aluminum securing plates with integral male T-shaped keys operatively interlocking the female T-shaped slots of said side rails to said catwalk where said side rails engage said catwalk, an extruded aluminum key and tongue cover with male T-shaped keys operatively interlocking with the female T-shaped slots of the said side rails where they form the bifurcated slot, and said key and tongue cover extending forwardly therefrom outwardly in alignment with said catwalk, a hollow extruded aluminum tongue having female T-shaped slots therein slidably positioned inside said key and tongue cover, pin means operatively maintaining said securing plates, said side rails, said key and tongue cover, and said tongue in longitudinal relation, and said pin means providing a pivotal support for said tongue, extruded aluminum spring frames with male T-shaped keys operatively interlocked with said female T-shaped slots of said side rails, extruded aluminum cross channels with female T-shaped slots therein operatively extending between the side rails to provide lateral suport to said side rails and said cross channels operatively interlocked to the side rails and the spring frames, an extruded aluminum end cross channel operatively extending between the ends of the side rails to provide lateral support to the ends of said side rails, means operatively interlocking said end cross channel to the ends of said side rails, and bolt means insuring positive connection of said interlocking means with said end cross channel and the ends of said side rails.

4. In a frame for a trailer for boats and the like, the combination of an extruded metal catwalk positioned to serve as a longitudinal center for said frame, said catwalk having a plurality of longitudinally extending female T-shaped slots formed therein, a pair of extruded metal side rails operatively positioned adjacent said catwalk at one end thereof and extending outwardly to the rear in symmetrical relation to said catwalk, said side rails having a plurality of longitudinally extending female T-shaped slots formed therein, a pair of extruded metal securing plates having longitudinally extending made L-shaped keys thereon operatively interlocking said side rails to said catwalk at the adjacent positions at one end thereof by slidably engaging the L-shaped keys of said plates in the T-shaped slots of said side rails and said catwalk, a plurality of aluminum cross channels extending between said side rails and operatively interlocked thereto, said cross channels maintaining the proper positioning of said side rails in relation to said catwalk, said cross channels being operatively connected to said catwalk.

an extruded metal key and tongue cover having longitudinally extending male T-shaped keys thereon operatively interlocked to said side rails where said side rails are interlocked to said catwalk, said key and tongue cover being in parallel relation to said catwalk but extending forwardly therefrom, an extruded metal tongue slidably received in said key and tongue cover, pin means operatively connecting said interlocked securing plates, side rails, and key and tongue cover together to prevent longitudinal sliding movement therebetween, said pin means pivotally mounting said tongue in said key and tongue cover, an extruded metal end cross channel extending between the ends of said side rails opposite said one end of said catwalk, said end cross channel operatively connected to the end opposite said one end of said catwalk, means operatively interlocking the last said ends of said side rails to said end cross channel, vertically and longitudinally adjustable cradle means removably affixed to said side rails, vertically and laterally adjustable roller means removably affixed to said end cross channel, and vertically and longitudinally adjustable roller means removably affixed to said catwalk.

5. In a frame for a trailer for boats and the like adapted to be connected to a trailer hitch mounted on a vehicle, the combination of a pair of extruded metal side frames operatively positioned together to form a parallel bifurcated slot between them at one end thereof, and extending outwardly to a symmetrically spaced relation towards the opposite end thereof, a long extruded metal catwalk having one end thereof operatively interlocked in said bifurcated slot by tongue and groove lock means, said catwalk extending into and bisecting the space between said side frames, a short extruded metal key and tongue cover operatively interlocked in said bifurcated slot by tongue and groove lock means and extending opposite to said catwalk in parallel relation thereto, an extruded metal tongue pivotally mounted in said key and tongue cover, said tongue adapted to be connected to said trailer hitch, extruded metal spring frame means operatively interlocked to said side frames by tongue and groove lock means, said frame means having a plurality of transverse slots therein, a plurality of extruded metal cross channels extending between the spaced sides of said side frames, said cross channels removably engaging said slots in said spring frame means and being locked therein by the interlocking between said side frames and said spring frame means, bolt means securing said catwalk to said cross channels, an extruded metal end cross channel extending between the spaced ends of said side frames, means operatively interlocking the end cross channel to the ends of said side frames, bolt means removably affixing said end cross channel to said catwalk, a vertically and longitudinally adjustable cradle mounted by bolt means interlocking to each of said side frames, a plurality of longitudinally and vertically adjustable rollers operatively affixed to said catwalk by bolt means interlocked to said catwalk, and a plurality of vertically and transversely adjustable roller means operatively affixed to said end cross channel by bolt means interlocked to said end cross channel.

6. In a frame for a trailer for boats and the like adapted to be connected to a trailer hitch mounted on a vehicle, the combination of a pair of side frames operatively positioned together to form a parallel bifurcated slot between them at one end thereof, and extending outwardly to a symmetrically spaced relation towards the opposite end thereof, a catwalk having one end thereof operatively interlocked in said bifurcated slot by tongue and groove lock means, said catwalk extending into and bisecting the space between said side frames, a key and tongue cover operatively interlocked in said bifurcated slot by tongue and groove lock means and extending opposite to said catwalk in parallel relation thereto, a tongue pivotally mounted in said key and tongue cover, said tongue adapted to be connected to said trailer hitch, a plurality of extruded metal cross channels extending between the spaced sides of said side frames and being operatively interlocked thereto, means removably affixing said catwalk to said cross channels, an end cross channel extending between the spaced ends of said side frames, means operatively interlocking the end cross channel to the ends of said side frames by tongue and groove lock means, and means removably affixing said end cross channel to said catwalk.

7. In a frame for a trailer for boats and the like, the combination of a plurality of extruded hollow metal members, some members being formed with female contoured locking slots and some members formed with locking keys thereon complementary in shape to said slots, said members being operatively connected to form said frame so that said keys slidably engage said slots to form positive interlocks between said members, means to secure said interlocked members in position and prevent sliding movement thereof, and metal interlocking means secured to and extending between some of said members which meet at the ends thereof at substantially 90° angles, certain of said metal members being provided to secure spring means to said frame, said last-named metal members including a support means having several arcuate sections therein of over 180° in extent for extending transversely of the frame, certain of said sections being adapted to receive and engage positioning means extending therethrough, and a key means for slidably engaging one of said sections and completing a support sleevee therewith.

8. In a trailer for boats and the like, the combination of a frame comprising a plurality of extruded metal frame members with female T-shaped slots and male T-shaped keys thereon and extending the length thereof, said members being operatively connected together to form the frame of the trailer by interlocking one of said male T-shaped keys of one frame member into one of said female T-shaped slots of a second frame member, bolt means utilized to prevent longitudinal sliding movement between interlocked frame members, cradle means, means securing said cradle means to said frame and being adjustable in the vertical and longitudinal directions with relation to said frame, spring means for said frame, an axle operatively mounted on said spring means, wheels mounted on said axle, and means securing said spring means to said frame, said means including a support means having an arcuate section therein extending transversely of said frame, a key means slidably engaging said support means and completing a support sleeve therewith, and means carried by said support sleeve to position said spring means therefrom.

9. A boat trailer or the like primarily made from a plurality of extruded metal members each of substantially the same shape for the length thereof, and comprising a pair of hollow box-shaped side rails having locking slots in the bottom thereof, a pair of spring frame covers of generally inverted U-shape in section and having a locking lug on the top thereof for slidably engaging the bottom locking slots of said side rails to secure said spring frame covers to said side rails, and cross bar means having at least one extending lug and an axially protruding shoulder formed on each end thereof, said spring frame covers having apertures therein for receiving said lugs to position said cross bar means, said cross bar means being engageable with said spring frame covers only prior to their slidable engagement with said side rails, said side rails being slidable past the ends of said cross bar means but engaging said shoulders to prevent disengagement of said cross bar means from said spring frame covers.

10. A boat trailer, or the like, comprising a pair of side rails having locking slots in the bottom thereof extending the length thereof, a pair of spring frame covers of generally inverted U-shape in section and having a locking lug on the top thereof and extending the length thereof for slidably engaging the bottom locking slots of said side rails to secure said spring frame covers to said side rails, said spring frame covers being shorter in length than said side rails, and cross bar means having at least one downwardly extending lug and an axially protruding shoulder formed on each end thereof, said spring frame covers having apertures therein for receiving said lugs to position said cross bar means to extend between said side rails, said cross bar means being engageable with said spring frame covers only prior to their slidable engagement with said side rails, said side rails being slidable relative to the ends of said cross bar means but engaging said shoulders to prevent disengagement of said cross bar means from said spring frame covers.

11. In a frame for a trailer for boats and the like, the combination of a plurality of extruded hollow metal members, some members formed with female contoured locking slots extending the length thereof and some members formed with locking keys thereon extending the length thereof and being complementary in shape to said slots, said members being operatively connected to form said frame by said keys slidably engaging said slots to form positive slidable interlocks between said members, means engaging said metal members when interlocked to secure them against movement, auxiliary frame means, and headed bolt means having their heads slidably but nonrotatably engaged by a said locking slot in one of said members and engaging said auxiliary frame means to secure one of said metal members and auxiliary frame means in fixed relation at any portion of the length of said one of said metal members.

12. In a frame for a trailer for boats and the like, the combination of a plurality of metal members, some members formed with T-shaped female locking slots extending the length thereof and some members formed with T-shaped locking keys thereon extending the length thereof and being complementary in shape to said slots, said members being operatively connected by said keys slidably engaging said slots to form positive slidable interlocks between said members, means engaging said metal members when interlocked to secure them against movement, auxiliary trailer means, and headed bolt means having their heads slidably but nonrotatably engaged by a said locking slot in one of said metal members at any portion of the length thereof and extending from a said locking slot to engage one of said auxiliary trailer means to secure said one of said metal members and auxiliary trailer means in fixed relation at any portion of the length of said one of said metal members.

13. In a frame for a trailer for boats and the like, the combination of a plurality of extruded metal members two of which form side rails, some members being formed with T-shaped female locking slots extending the length thereof and some members being formed with T-shaped locking keys thereon extending the length thereof and being complementary in shape to said slots, said members being operatively connected by said keys slidably engaging said slots to form positive slidable interlocks between said members, one of said metal members forming a longitudinally extending frame section and having a locking slot formed in the bottom thereof, means engaging said metal members when interlocked to secure them against movement, cross bar means secured to and extending between said side rails, and headed bolt means having its head slidably but nonrotatably engaged by said bottom locking slot at any portion of the length thereof and extending from said locking slot to engage said cross bar means.

14. A readily assembled boat trailer or the like primarily made from a plurality of extruded metal members each of at least substantially the same shape for the length thereof, and comprising a pair of hollow box-shaped side rails having locking slots in the sides and bottom thereof, a pair of spring frame covers of generally inverted U-shape in section and having a locking lug on the top thereof for slidably engaging some of said side locking slots in said side rails at the front portions thereof to secure said cover members and said side rails together, a flat downwardly extending channel shaped catwalk having locking slots in the sides thereof for positioning on the center line of the trailer and below the front ends of said side rails, locking plates with overhanging lugs thereon to engage the locking slots in said catwalk and said side rails to secure them together in the boat trailer, cross bar means having downwardly extending lugs formed on the ends thereof, said spring frame covers having apertures therein for receiving the lugs of said cross bar means to position said cross bar means, and an end cross bar of hollow shape in vertical sections; and interlocking end members having arms extending at right angles to each other to secure said end cross bar to the rear ends of said side rails in assembly of the trailer.

15. A readily assembled boat trailer or the like primarily made from a plurality of extruded metal members each of substantially the same shape for the length thereof, and comprising a pair of hollow box-shaped side rails having locking means in the sides and bottom thereof, a pair of spring frame covers of generally inverted U-shape in section and having a locking means on the top thereof for slidably engaging the bottom locking means of said side rails to secure said spring frame covers to said side rails, a generally U-shaped cover member with locking means on the sides thereof for slidably engaging some of said side locking means in said side rails at the front portions thereof to secure said cover member and said side rails together, a flat downwardly extending channel shaped catwalk having locking means in the sides thereof for positioning on the center line of the trailer and below the front ends of said side rails, locking plates with locking means thereon to engage the locking means in said catwalk and said side rails to secure them together in the boat trailer, and cross bar means having protruding lugs formed on the ends thereof, said side rails having apertures therein for receiving said lugs to position said cross bar means, said locking means on said metal members including protruding locking lugs on certain of said metal members and locking slots shaped complementary to said locking lugs formed on the other ones of said metal members with which said certain metal members are engaged.

16. In a trailer for boats and the like, the combination of a frame comprising a plurality of extruded metal frame members with either female T-shaped slots or male T-shaped keys thereon and extending the length thereof, said members being operatively connected together to form the frame of the trailer by slidably interlocking one of said male T-shaped keys of one frame member into one of said female T-shaped slots of a second frame member, bolt means engaging said assembled frame members to prevent relative sliding movement between interlocked frame members, cradle means, and means securing said cradle means to said frame, said last-named means being adjustable in both the vertical and longitudinal directions with relation to said frame to vary the position of said cradle means.

17. In a trailer for boats and the like, the combination of a catwalk, side rails spaced closely adjacent the forward end of said catwalk and extending outwardly to the rear in parallel spaced relation with said catwalk as the center line thereof, securing means operatively attaching said side rails to said catwalk at the forward end thereof, complementary longitudinally extending locking means formed on said securing means and on said catwalk and side rails for interlocked slidable engagement therebetween, means preventing longitudinal movement of said interlocked catwalk, side rails and securing means by engagement thereof, at least one cross channel extending between said side rails and operatively interlocked thereto to maintain the parallel spaced relation of said side rails, and means locking said cross channel to said catwalk.

18. A boat trailer, or the like, comprising a pair of side rails having locking slots in the bottom thereof extending the length thereof, a pair of spring frame covers of generally inverted U-shape in section and having a locking lug on the top thereof and extending the length thereof for slidably engaging a bottom locking slot of a said side rail to secure said spring frame covers to said side rails, said spring frame covers being shorter in length than said side rails, cross bar means having at least one downwardly extending lug formed on each end thereof, said spring frame covers having apertures therein for receiving said lugs to position said cross bar means to extend between said side rails, said side rails being slidable relative to the ends of said cross bar means, and means securing said cross bar means to said side rails.

References Cited by the Examiner

UNITED STATES PATENTS

| | | | |
|---|---|---|---|
| 1,116,391 | 11/1914 | Davison. | |
| 1,797,530 | 3/1931 | Mayer | 280—106 X |
| 2,586,485 | 2/1952 | Schroeder | 214—84 |
| 2,589,304 | 3/1952 | Spangler. | |
| 2,691,450 | 10/1954 | Rosenbaum | 214—38.8 |
| 2,719,691 | 10/1955 | Vance | 248—298 X |
| 2,799,464 | 7/1957 | D'Azzo | 248—298 X |
| 2,836,278 | 5/1958 | Kindell | 214—84 X |
| 2,877,875 | 3/1959 | Bolt. | |
| 2,932,418 | 4/1960 | Ripley | 214—505 |
| 2,938,735 | 5/1960 | Bennett | 280—414 X |
| 3,058,552 | 10/1962 | Barss. | |
| 3,104,770 | 9/1963 | Calkins et al. | 214—84 |

GERALD M. FORENZA, *Primary Examiner.*

HUGO O. SCHULZ, *Examiner.*